United States Patent [19]

Law

[11] Patent Number: 4,758,128
[45] Date of Patent: Jul. 19, 1988

[54] DISABLED CAR CARRIER VEHICLE

[75] Inventor: Kenneth A. Law, Chattanooga, Tenn.

[73] Assignee: Holmes International Inc., Chattanooga, Tenn.

[21] Appl. No.: 20,096

[22] Filed: Feb. 27, 1987

[51] Int. Cl.⁴ .............................................. B60P 1/28
[52] U.S. Cl. ..................................... 414/477; 52/588; 296/1 F
[58] Field of Search ................................ 414/477–480; 296/181, 183, 1 F; 52/588, 822, 823

[56] References Cited

U.S. PATENT DOCUMENTS

| | | | |
|---|---|---|---|
| 2,786,556 | 3/1957 | Constance, Jr. | 52/588 |
| 2,872,240 | 2/1959 | Bennett | 296/181 |
| 2,956,653 | 10/1960 | Liskey, Jr. | 52/588 X |
| 3,074,574 | 1/1963 | Prince | 414/477 |
| 3,501,186 | 3/1970 | Wilcox et al. | 52/822 X |
| 3,550,801 | 12/1970 | Larson et al. | 414/480 |

FOREIGN PATENT DOCUMENTS

| | | | |
|---|---|---|---|
| 151536 | 11/1951 | Australia | 52/588 |
| 1280010 | 11/1961 | France | 52/588 |
| 2459335 | 2/1981 | France | 52/588 |
| 131436 | 10/1981 | Japan | 414/477 |
| 1438598 | 6/1976 | United Kingdom | 52/588 |

OTHER PUBLICATIONS

Transportation Equipment Development Corp., 1961, brochure entitled, "Piggyback Transporter".

Primary Examiner—Joseph E. Valenza
Assistant Examiner—David A. Bucci
Attorney, Agent, or Firm—Alan Ruderman

[57] ABSTRACT

A carrier vehicle for transporting disabled cars has a support platform including a support deck between a pair of side boards, the deck being formed from a number of extruded aluminum panels and the side boards each being an aluminum extrusion. The panels are interconnected together by integral locking connectors at corresponding ends and have feet at the end of downwardly depending legs which are supported at the lateral sides by lips on the side boards which together with an upper lip forms a recess for receiving the sides of the deck panels. The construction interconnects the panels together and with the side boards to limit or preclude relative vertical movement thereby providing a strong load bearing structure and minimizing the number of welds required.

3 Claims, 1 Drawing Sheet

DISABLED CAR CARRIER VEHICLE

BACKGROUND OF THE INVENTION

This invention relates to slidable and tiltable platform vehicle carriers of the type wherein the platform slides and tilts to provide a ramp for loading a vehicle thereon for transporting over the road, and more particularly to the construction of the platform to provide a light weight yet strong and durable structure.

In the art of recovering disabled vehicles, when more than one vehicle must be recovered, use may be made of a truck or carrier vehicle having a slidable and tiltable deck or platform on which at least one vehicle may be loaded and carried. In order to provide a strong yet light weight deck, it is customary to construct such decks from aluminum. Because the deck has a substantial size it is conventional to form the deck from a number of interconnected sections or panels, which may be extruded units. In the known prior art the interconnection between panels is by a tongue in groove arrangement permitting relative vertical movement therebetween. The panels are supported on and welded to the bed rails which are slidably and tiltably attached to the frame of the carrier vehicle. Since the strength of aluminum welds is weaker than that of the base material the welds are first to fail when overloaded. The vertical load on the deck and thus the welds can be substantial, especially when the carrier vehicle is driven over rough roads. Once the welds fail the structural integrity, the load carrying ability and the longevity of the deck may greatly be impaired. To protect against such weld failures it is customary to provide a significant safety factor and overdesign the number of welds. This obviously increases the manufacturing costs for producing such vehicle carriers.

SUMMARY OF THE INVENTION

Consequently, it is a primary object of the present invention to provide a vehicle carrier support deck constructed from extruded aluminum sections assembled with a minimum amount of welded joints while providing a strong, high load bearing integral structure.

It is another object of the present invention to provide a vehicle carrier support deck constructed from extruded aluminum side members and deck panels, the configuration of the side members and deck panels being such that the forces on the support deck are carried by the structural elements rather than the welds joining the structural elements.

It is a further object of the present invention to provide a slidable and tiltable support deck vehicle carrier having a number of deck panels configured so as to be interconnected together in a manner such that the panels form an integral deck structure, the panels being supported on the sides by extruded side board members having panel support flanges which reduces the relative vertical movement of the panels and minimizes the loads on the welds, thereby increasing the structural integrity and longevity of the deck.

It is a still further object of the present invention to provide a vehicle carrier support deck comprising a number of deck panels connected together in a manner which not only transmits the horizontal load between the panels, but also minimizes the relative vertical movement between the panels and thus reduces the load on the welds and minimizes the number of welds required.

Accordingly, the present invention provides a vehicle carrier having a support deck formed from a series of extruded aluminum panels interconnected together by integral locking connectors at corresponding ends thereof to form a substantially flat upper surface, the deck panels having downwardly depending legs which are supported at the lateral extremities thereof by side board members each having an integral flange on which the legs are disposed. The flange is spaced from a shoulder on the side board which together with the flange forms a recess for receiving the respective sides of the deck panels. The side board members are extruded hollow aluminum structural members so that the entire carrier support deck is light weight. With this construction, the deck panels have vertical supports on the side boards so that the number of welds can be reduced, yet a strong integral structure is provided. Additionally, the interconnection between the panels is such that not only are the horizontal forces transmitted longitudinally through the connections, but also the vertical forces so that relative vertical movement between adjacent panels is minimized, if not eliminated, and this too reduces the load on the welds.

BRIEF DESCRIPTION OF THE DRAWINGS

The particular features and advantages of the invention as well as other objects will become apparent from the following description taken in connection with the accompanying drawings, in which.

DESCRIPTION OF THE PREFERRED EMBODIMENT

Figure 1:
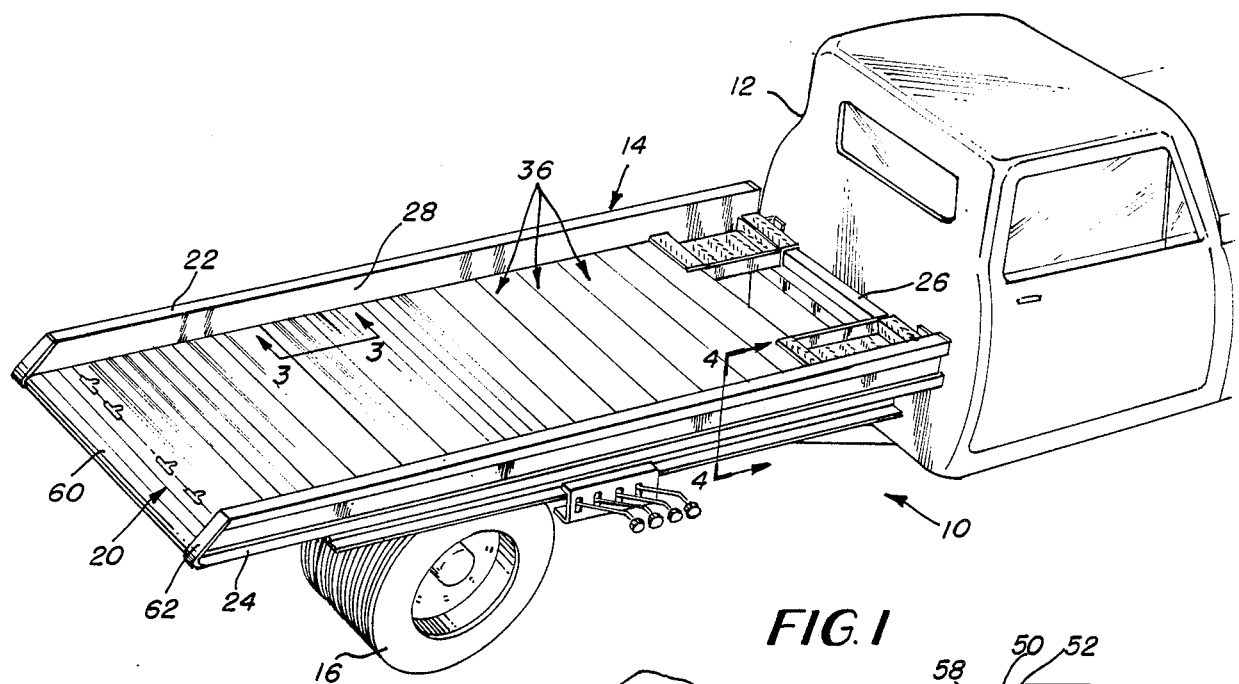
FIG. 1 is a perspective view of a portion of a disabled car carrier vehicle having the car supporting platform constructed in accordance with the principles of the present invention.

Referring to the drawings, FIG. 1 illustrates a disabled car carrier vehicle generally indicated at 10 which conventionally is a truck chassis having a cab 12 at the front thereof and a tiltable and slidable bed 14 extending rearwardly from the cab, the carrier vehicle having at least four sets of wheels, only one of which is illustrated at 16, conventionally disposed in pairs at the front and rear of the vehicle. The bed is supported on a number of frame members forming the chassis and includes a series of tiltable and slidable beams which extend longitudinally front to back in the form of channel members or I-beams 18, only one of which is illustrated, this being in FIG. 2. The bed 14 includes a platform generally indicated at 20 which is supported on and moveable with the bed beams, the platform being adapted for supporting a disabled car. A second disabled car may be towed from the rear of the vehicle by means (not illustrated) mounted beneath the vehicle.

Figures 2, 4, 5:
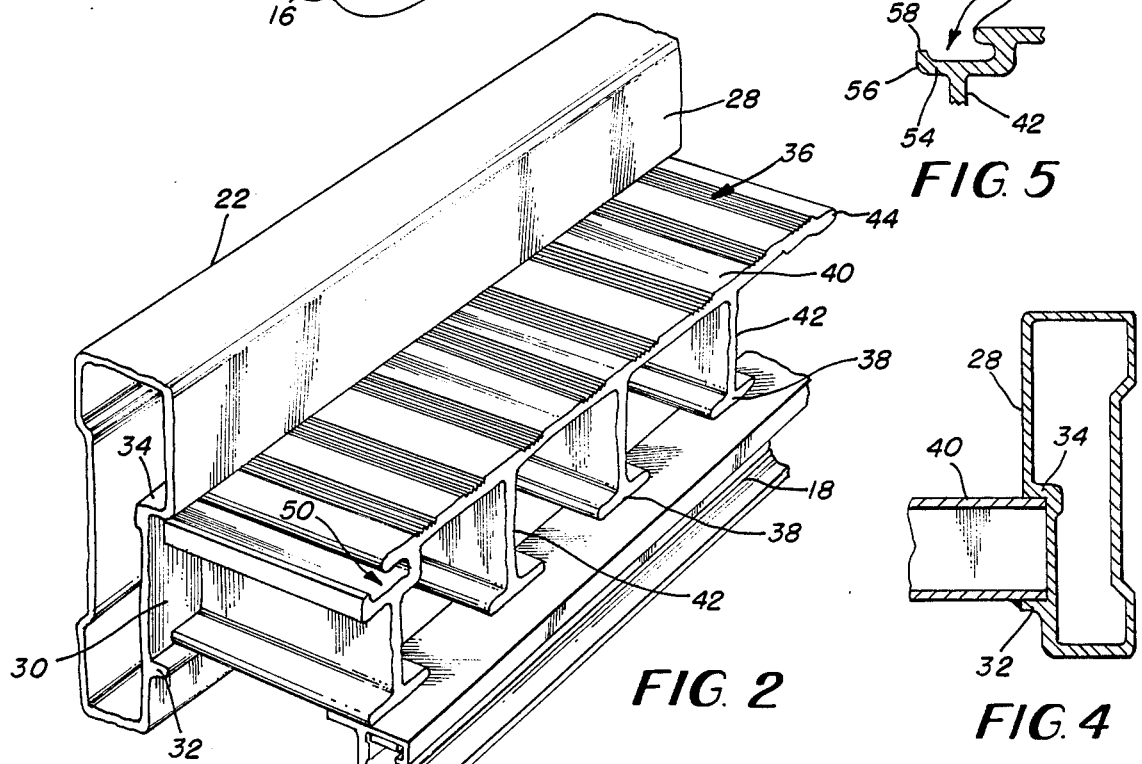
FIG. 2 is a fragmentary perspective view of a portion of the platform illustrated in FIG. 1 depicting one panel with parts thereof broken away.
FIG. 4 is a cross sectional view taken substantially along line 4—4 of FIG. 1.
FIG. 5 is a view depicting a portion of the panel illustrated in FIG. 3, but greatly enlarged.

The platform 20 comprises a pair of side boards 22, 24 spaced apart across the width of the platform, each of which is welded to a channel beam 26 at the front. Each side board 22, 24 comprises a hollow aluminum extrusion having a cross sectional configuration as illustrated in FIGS. 2 and 4. The interior facing wall 28 of each side board is recessed to form a mouth 30 between a pair of spaced apart lips 32, 34. Received within the mouth 30 is the end of a respective side of a plurality of deck panels 36. The panels 36, as hereinafter further described, includes a supporting base comprising a number of feet 38 which are disposed on the upper surface of the lower lip 32, and an upper surface 40 which abuts the lower surface of the upper lip so that the sides of the deck are snugly nestled within the mouth 30 in the side boards. The feet 38 are welded to the upper surface of the lip 32 which effectively forms a supporting flange for the sides of the panels, while the upper lip precludes, or at least limits, vertical movement of the panels at the sides of the vehicle. Between the side boards the feet are supported on and welded to the beams 18, there being at least two such beams spaced across the bed.

The platform deck comprises a plurality of the panels 36, the number depending upon the length of the platform 20. The panels in a full size vehicle may be approximately 7 feet 2 inches wide and 12 inches in length, the length being measured in the longitudinal direction of the bed such that a full size vehicle may have approximately fifteen panels. Each panel comprises an extruded aluminum member having the upper surface 40 defining the deck support floor and a number of the support feet 38 formed at the lower end of a respective web 42 which are integral with and extend downwardly from the floor. Rather than having a single continuous member extending substantially parallel to the platform floor, it is preferred to have a plurality of support feet spaced apart so as to aid in reducing the weight of the structure. Preferably there are four such feet 38 and webs 42 per panel.

Figure 3:
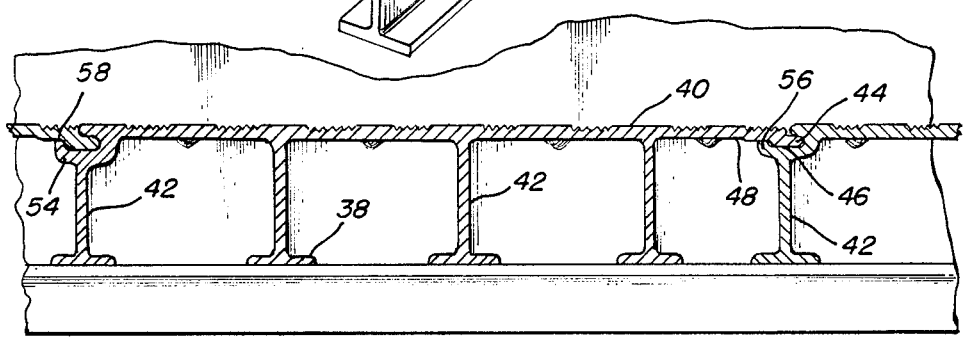
FIG. 3 is a cross sectional view taken substantially along line 3—3 of FIG. 1.

The panels in the longitudinal direction of the bed are interconnected together into a strong load bearing unit by a unique interconnecting arrangement which not only locks the panels together longitudinally but also vertically. As illustrated, one end of each panel has a downwardly stepped protuberance 44 projecting beyond the longitudinal extent of the upper surface, the protuberance 44 having a lower edge 46 spaced below the lower surface 48 of the panel floor. The other end of each panel has a socket 50 formed below the floor, the socket having a size and configuration for receiving the protuberance 44 at the end of an adjacent floor panel. The socket 50 is recessed inwardly from the top edge 52 of the panel for receiving the end of the protuberance and has an extension 54 which is superposed below the lower edge 46 of the protuberance. The extension 54 is supported by one of the webs 42 and has an arm portion 56 which projects upwardly to terminate at an edge 58 for engaging the lower surface 48 of the floor of the adjacent panel. Thus, as illustrated in FIG. 3, the protuberance 44 of a first panel is snugly received within the socket 50 of the adjacent panel while the terminal edge 58 of the arm 56 engages, is welded to and supports the end of the first panel. Consequently, the web 42 and support foot 38 at the end of one panel supports the adjacent panel so that the panels act to provide a continuous structure one to the other. During assembly of the panels, one panel is tilted upwardly slightly to insert and seat its protuberance 44 into the socket 50 of the adjacent panel, and thereafter tilted back to interlock the panels together. Since the protuberance 44 extends into the socket 50 beneath the edge 52, the protuberance of one panel is prevented from moving vertically relative to the adjacent panel. Consequently, the relative vertical movement between adjacent panels is minimized and the load on the welds between the lower surface 48 adjacent the protuberance of one panel and the arm 56 of the other panel are minimized. Thus, the integretity of the structure is maintained between the deck panels while the load on the interconnecting welds is minimized. Additionally, since the load on each weld is reduced, less welding is required, thereby reducing the manufacturing costs in assembling the carrier.

A rear panel 60 having a rearwardly and downwardly tapered surface interlocks with the adjacent panel to close the rear end of the deck, while end caps 62 close off the rear end of the respective side boards 22, 24 and supports the rear end of the rear panel 60.

Numerous alterations of the structure herein disclosed will suggest themselves to those skilled in the art. However, it is to be understood that the present diclosure relates to the preferred embodiment of the invention which is for purposes of illustration only and not to be construed as a limitation of the invention. All such modifications which do not depart from the spirit of the invention are intended to be included within the scope of the appended claims.

Having thus set forth the nature of the invention, what is claimed herein is:

1. A carrier vehicle for transporting disabled cars or the like, said vehicle having an elongated bed at the rear thereof adapted to be slidably and tiltably moved, said bed including longitudinally extending slidable beam means for supporting a platform, said platform comprising a pair of longitudinally extending side boards spaced apart laterally and a longitudinally extending support deck, said support deck comprising a plurality of extruded aluminum panel members extending intermediate said side boards, each of said panel members having an upper wall including an upper surface defining a support surface and a lower surface, a plurality of spaced webs extending from said lower surface and terminating in respective feet, said support surfaces of said panel members being connected together at respective adjacent laterally extending longitudinal ends thereof for forming the longitudinal extent of said support surfaces into a continuous support surface and with said feet extending laterally, means for securing the feet of said webs to said beam means, said side board members comprising extruded aluminum members having walls forming a hollow interior, one wall of each side board having a recessed mouth defined between upper and lower lips, each upper lip being defined by a step in said one wall indented into the hollow interior of the side board, said one wall continuing in indented fashion downwardly and said lower lip comprising a flange protruding from the indented portion of the wall, each of said panels being nestled within the mouth of both side boards at respective lateral ends with all the feet disposed on and secured to the lower lips of both side boards and the upper surface substantially abutting the upper lips.

2. A carrier vehicle as recited in claim 1, wherein one laterally extending end of each panel member comprises a protuberance stepped downwardly from and projecting beyond the longitudinal border of the upper surface of said panel, and another longitudinally extending end comprising a socket disposed beneath the upper surface of said panel, said socket being recessed inwardly relative to the upper surface of the panel, the socket of one panel being adapted for receiving the protuberance of an adjacent panel for precluding relative vertical and longitudinal movement therebetween.

3. A carrier vehicle as recited in claim 2, wherein each socket has a wall defining an extension protruding longitudinally beyond the longitudinal border of the upper surface of said panel, said extension having an arm extending upwardly and terminating at an edge disposed at the elevation of said lower surface for engaging the lower surface of an adjacent panel when the protuberance of said adjacent panel is disposed within the socket, and said extension having a downwardly extending web including a foot thereon for securement to said beam means, thereby to provide vertical support at the joint between adjacent panels.

* * * * *